United States Patent [19]

Wishart et al.

[11] Patent Number: 5,699,363
[45] Date of Patent: Dec. 16, 1997

[54] DIGITAL SIGNAL PROCESSING APPARATUS

[75] Inventors: Alexander Walker Wishart, London; Paul Simon Cornfield, Hertfordshire, both of United Kingdom

[73] Assignee: MMS Space Systems Unlimited, Middlesex, United Kingdom

[21] Appl. No.: 504,791

[22] Filed: Jul. 20, 1995

[30] Foreign Application Priority Data

Jul. 20, 1994 [GB] United Kingdom ............... 9414664

[51] Int. Cl.$^6$ .................................................. H04J 1/02
[52] U.S. Cl. ............................ 370/497; 370/210; 375/350
[58] Field of Search ........................... 370/69.1, 123, 370/70, 23, 310, 329, 343, 344, 480, 484, 488, 497, 210; 375/350, 240; 364/724.1, 726.01, 724.13

[56] References Cited

U.S. PATENT DOCUMENTS

| | | | |
|---|---|---|---|
| 4,393,456 | 7/1983 | Marshall, Jr. | 370/70 |
| 4,729,112 | 3/1988 | Millar | 364/724 |
| 4,785,447 | 11/1988 | Ichiyoshi | 370/70 |
| 4,799,179 | 1/1989 | Masson et al. | 364/724 |
| 4,829,378 | 5/1989 | LeGall | 358/160 |
| 4,943,855 | 7/1990 | Bheda et al. | 358/133 |
| 5,109,419 | 4/1992 | Griesinger | 381/63 |
| 5,214,678 | 5/1993 | Rault et al. | 375/122 |
| 5,216,719 | 6/1993 | Oh | 381/86 |
| 5,268,905 | 12/1993 | Soloff et al. | 370/69.1 |
| 5,299,192 | 3/1994 | Guo et al. | 370/70 |
| 5,420,891 | 5/1995 | Akansu | 375/350 |
| 5,436,940 | 7/1995 | Nguyen | 375/240 |

OTHER PUBLICATIONS

P.P. Vaidyanathan, Multirate Systems and Filter Banks, Prentice Hall, Englewood Cliffs, New Jersey, pp. 120–122, 132–143, 256–259 1993.

Primary Examiner—Hassan Kizou
Assistant Examiner—Kwang Bin Yao
Attorney, Agent, or Firm—Donald C. Casey

[57] ABSTRACT

A digital signal processing apparatus for frequency multiplexing and demultiplexing of narrow band FDM signals has a first block fine processing stage (11) connected in series to a first block coarse processing stage (16, 17) and in parallel therewith a second block fine processing stage (11a) connected in series to a second block coarse processing stage (16, 17). The two stages 11 and 11a are coupled together at one side remote from the two coarse processing stages (16, 17) to provide a first port (14) and the stages (16 and 17) at the side remote from the port (14) provide a plurality of ports (15). Each stage (11, 11a) is a FIR lowpass filter and each stage (16, 17) incorporates a polyphase filter (16) in connection with a Fast Fourier Transform Unit (17).

16 Claims, 4 Drawing Sheets

DIGITAL SIGNAL PROCESSING APPARATUS

This invention relates to a digit signal processing apparatus for frequency multiplexing and demultiplexing of narrow band Frequency Division Multiplex (FDM) signals, particularly, but not exclusively, suitable for use on communications satellites to support mobile or personal handheld telephone networks.

Such a communications satellite utilisation typically requires narrow band frequency channelisation of both uplinks and downlinks in the satellite onboard processor in order to perform the channel to beam routing function. It is highly deskable to have flexible channel to beam routing to provide sufficient system flexible in terms of matching traffic demand to antenna beam coverages on the links between the satellite and the mobile/personnel terminals. This channelisation function is expensive to implement with conventional digital signal processing apparatus.

Conventional digital signal processing apparatus for the multiplexing of a number of narrow band channels onto a signal broad band Frequency Division Multiplex (FDM) and the demultiplexing of a broad band FDM into its constituent narrow band channels generally divide the process into two stages, namely a block processing stage and a fine filter stage. In the block processing stage all the channels are simultaneously filtered at a coarse level of demultiplexing/multiplexing using some sort of Fast Fourier Transform based filter bank with a filter which has relatively relaxed transition bands and which forms the first stage of the demultiplexing process and the final stage of the multiplexing process. Conventionally this block processing stage is complemented by a fine processing stage having a bank of identical low pass filters with relatively tight transition bands, in which each filter acts on a separate channel.

Figure 1:
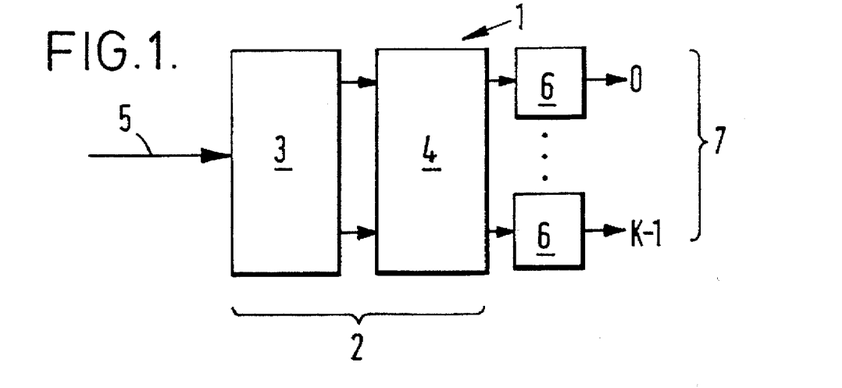
FIG. 1 is a block diagram of a conventional two stage demultiplexer not according to the present invention.
Figure 2:
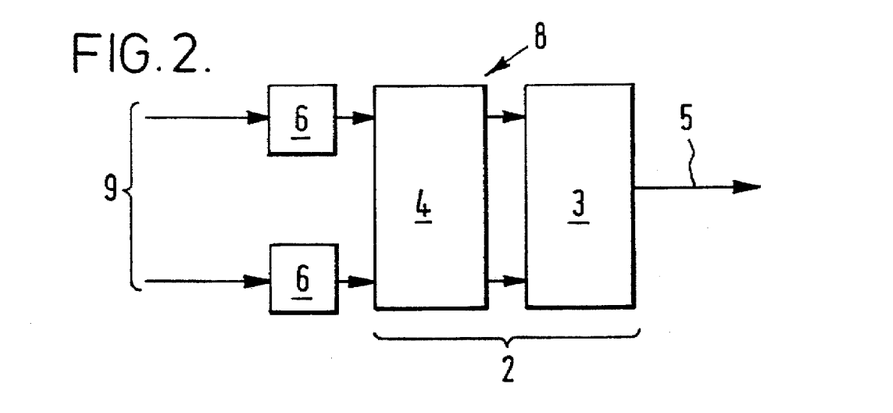
FIG. 2 is a block diagram of a conventional two stage multiplexer, not according to the present invention.
Figure 3A:
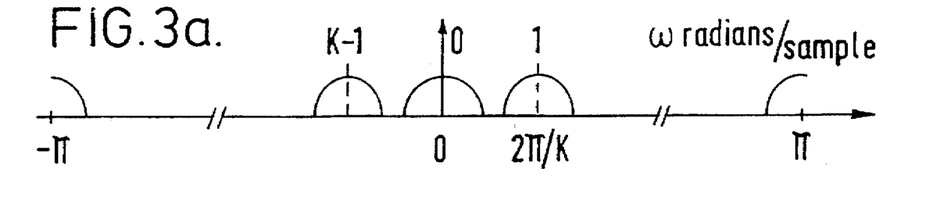
FIG. 3a is a graphical representation of the spectrum of the input FDM signal for FIG. 1 and the output FDM signal for FIG. 2.

A K-channel demultiplexer of conventional form is shown in FIG. 1 of the accompanying drawings and a conventional K-channel multiplexer is shown in FIG. 2 of the accompanying drawings. FIG. 3a shows the spectrum of the input FDM signal of K channels, even stacking, complex samples, critically sampled at $f_s$ samples per sec. The spectrum is shown between $\omega = \pm \pi$ radians per sample, and the spectrum is repeated indefinitely outside this region with periodicity of $2\pi$ radians per sample. The normalised radian frequency $\omega$ is related to sampling frequency $f_s$ by the following relation:

$$\omega = \frac{2\pi f}{f_s} \quad \frac{\text{radians/sec}}{\text{samples/sec}} = \text{radians/sample}$$

Thus the band edge can either be defined as $\omega = \pm \pi$ or as a frequency $f = \pm f_s/2$.

Figure 3B:
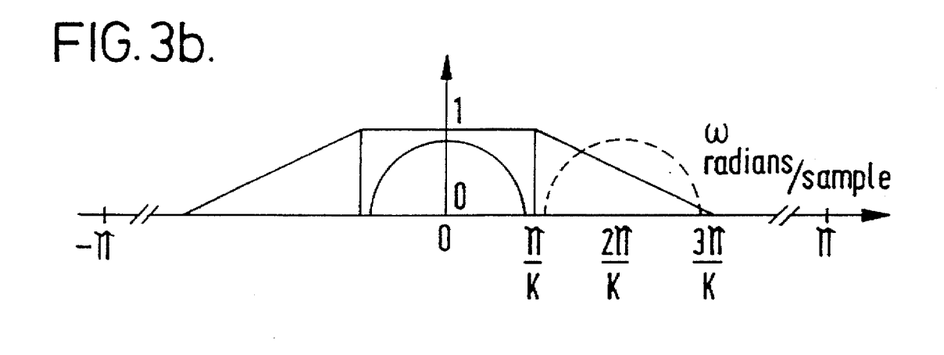
FIG. 3b is a graphical representation of the unit response which is imaged to form the frequency response of a filtering function within the block coarse processing stage of FIG. 1 or FIG. 2.

In the demultiplexer generally indicated at 1 a block processor generally indicated at 2, and made up of a coarse polyphase filter 3 and a linked K-point FFT unit 4, separates an input FDM signal 5 of K channels but leaves unwanted energy from the transition band regions of its filter in part of its spectral band of each output. The sampled spectrum of the input FDM is shown in FIG. 3a. FIG. 3b shows the frequency response of the polyphase filter/FFT for extracting channel 0. The frequency response has the same profile centred on each channel i.e. it has an imaged response. The pass band is centred on the desired channel, the transition bands are relatively relaxed and actually extend over the adjacent band on each side, and beyond that the stop band extends to $\pm \pi$. Such relaxed transition bands are necessary to reduce the complexity of the filter implementation, but render the fine filter bank necessary.

In addition, the relaxed transition bands restrict the maximum amount by which the output for each channel can be decimated in the polyphase filter/FFT. Thus, after the input FDM has been filtered by the comb-type filter whose response is the repeated (and partially overlapping) version of FIG. 3b, each channel is mixed with an appropriate local oscillator frequency so as to be down-converted to baseband, and the sampling frequency is reduced commensurate with the new, smaller, bandwidth.

Figure 3C:
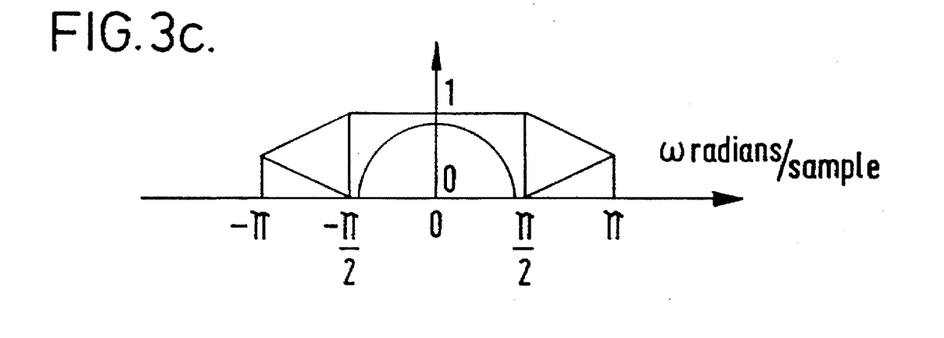
FIG. 3c is a graphical representation of the frequency response corresponding to FIG. 3b after decimation by K/2.

However, referring to FIG. 3c which shows the output of the polyphase filter/FFT for each individual channel, the signal information of each channel could be fully defined if the band edge was at the edge of the pass band, and not half way along the transition band as shown. (FIG. 3c shows the region of the spectrum between $\pm \pi$ and the spectrum repeats indefinitely outside this region with a periodicity of $2\pi$) FIG. 3c shows a decimation of K/2. The reason why this is the maximum possible decimation is that if the sampling rate was lower, the transition bands which contain signal energy from the two adjacent channels, would alias into the pass band of each individual channel.

A bank of tight filters 6 applied to these outputs acts to remove the transition band energy and completes the channelisation process into K output channels at 7.

In the conventional multiplexer 8 the bank of individual filters 6 conditions the K input channels 9 to the block processor 2 by ensuring that there is no spurious energy (for example introduced by up-sampling) which would fall within the transition bands of the block processor's filter 3 and would otherwise therefore cause interference.

Such a conventional two-stage apparatus generally leads to a lower computational workload than a single stage equivalent but there is still a need for an even lower total computational workload with greater flexibility in the overall decimation (interpolation) factor in the channelisation without compromising computation efficiency and without compromising the hardware implementation requirements.

According to one aspect of the present invention there is provided a digital signal processing apparatus for frequency demultiplexing of narrow band Frequency Division Multiplex (FDM) signals, including a block fine processing stage having an input for a FDM signal of K narrow band channels, outputs for at least one FDM signal with K/x even index channels, the region of the spectrum corresponding to K/x odd index channels having been nulled out, and at least one FDM signal with K/x odd index channels, the region of the spectrum corresponding to the K/x even index channels having been nulled out, x block coarse processing stages, the input of each of which is coupled to a respective output of the block fine processing stage and each having outputs for the K/x narrow band channels, each block coarse processing stage performing a filtering function with an imaged response the transition bands of which lie in the nulled out regions of the spectrum of the associated output of the fine processing stage.

According to a second aspect of the present invention there is provided a digital signal processing apparatus for frequency multiplexing of narrow band Frequency Division Multiplex (FDM) signals, including a plurality (x) of block coarse processing stages, each having respective inputs for K/x narrow band channels, and an output for a FDM signal with K/x channels, a block fine processing stage having inputs coupled to respective outputs of block coarse processing stages, and arranged to combine at least one input FDM signal with K/x even index channels with at least one input FDM signal with K/x odd index channels, the region of the spectrum corresponding to the odd index channels and the even index channels respectively being nulled, in each case, to produce a FDM signal of K narrow band channels, each block coarse processing stage performing a filtering function with an imaged response the transition bands of which lie in the nulled out regions of the response corresponding to the respective inputs of the block fine processing stage.

Now that the transition bands lie in the nulled out regions of the spectrum, maximum decimation of the individual narrow band outputs is now possible in the demultiplex mode and maximum interpolation of the individual narrow band inputs is now possible in the multiplex mode.

For a better understanding of the present invention, and to show how the same may be carded into effect, reference will now be made, by way of example, to the accompanying drawings in which.

As shown in the accompanying drawings, in particular in FIGS. 3d and 4 to 7 thereof, a digital signal processing apparatus 10 of the present invention for frequency multiplexing and demultiplexing of narrow band Frequency Division Multiplex (FDM) signals includes a block fine processing stage 11, 11a connected in series to a first block coarse processing stage 12 and to a second block coarse processing stage 12a. The block fine processing stage consists of blocks 11, 11a coupled together at the side 13 remote from the two block coarse processing stages 12 and 12a to provide a first port 14 operable at K channels and with the block coarse processing stages 12 and 12a each having a plurality of ports 15 providing K/x channels where x is the number of block coarse processing stages.

Figure 3D:
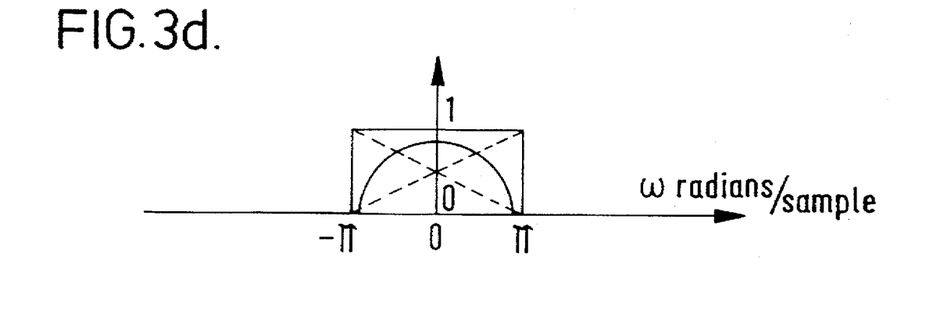
FIG. 3d is a graphical representation of the frequency response corresponding to FIG. 3b after decimation by K in accordance with the invention.
Figure 5:
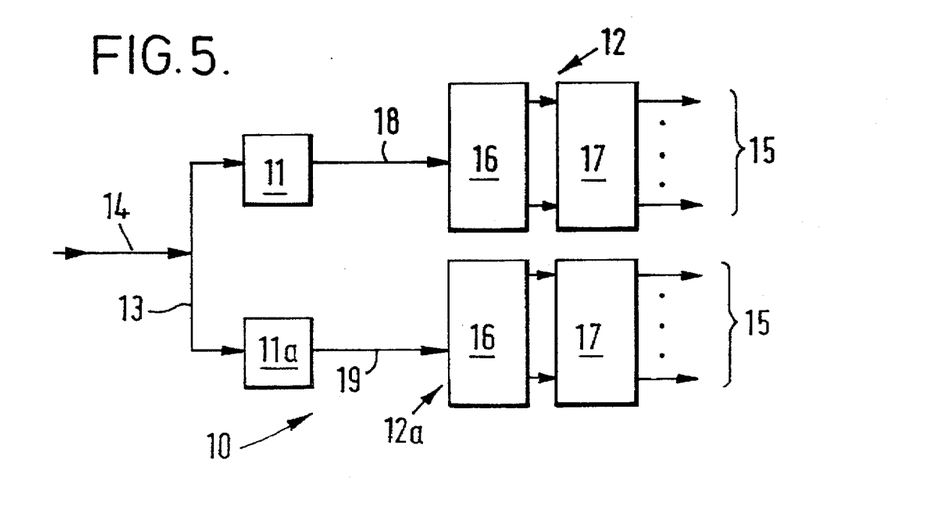
FIG. 5 is a block diagram of a two stage digital signal processing apparatus according to a first embodiment of the present invention operating as a demultiplexer.
Figure 6:
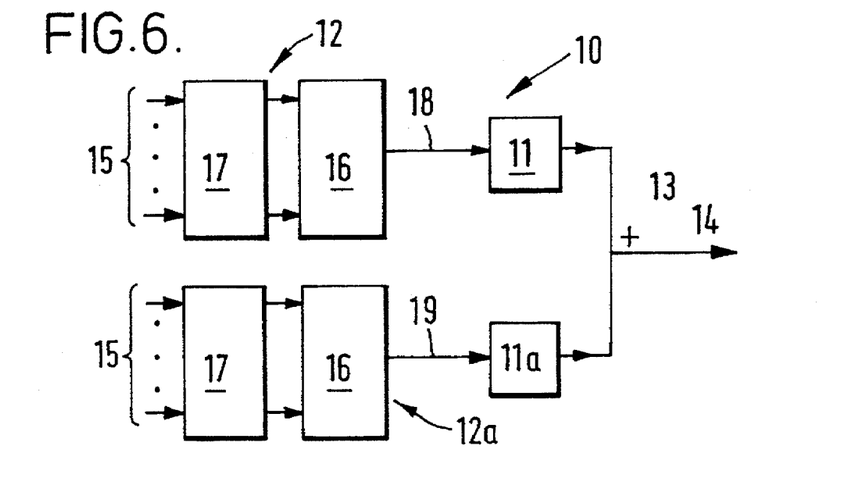
FIG. 6 is a block diagram of a two stage digital signal processing apparatus according to the present invention operating as a multiplexer.
Figure 7:
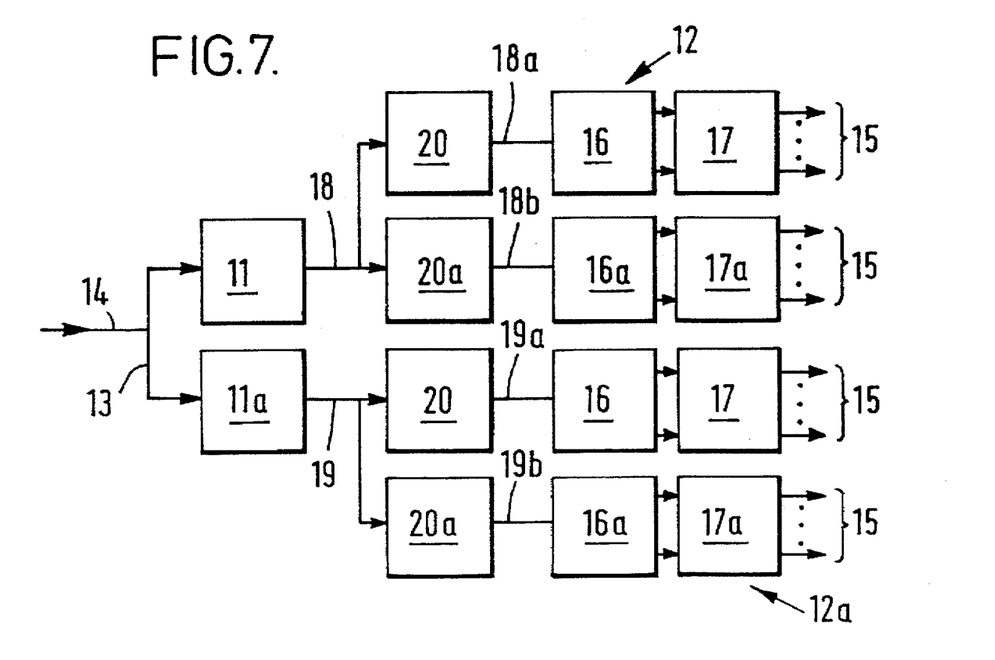
FIG. 7 is a block diagram of a three stage digital signal processing apparatus according to a second embodiment of the present invention operating as a demultiplexer.

The block processing stage of FIGS. 1 and 2 which implements coarse filtering remains unchanged for the apparatus of FIGS. 5 to 7, save in that in FIGS. 5 to 7 decimation by K takes place in accordance with FIG. 3d instead of in accordance with K/2 of FIG. 3c; and in that instead of a K-point FFT being implemented in the block processing stage 2 in FIGS. 1 and 2, two K/2 point FFTs are implemented in block processing stage 2, 2a, 12, 12a in FIGS. 5 and 6 and four K/4 point FFTs are implemented in block processing stages 12, 12a of FIG. 7. In contrast to the bank of fine filters 6 of FIGS. 1 and 2, the apparatus of the invention uses a block fine processing stage in which the channels are in a FDM format for fine filtering. In the demultiplexing mode as shown in FIG. 5 of the accompanying drawings the FDM broad band input signal of K channels (as shown in FIG. 3a) is fed to the first and second block fine processing stages 11 and 11a via the first port 14, split into two parts, one of which is passed through the first block fine processing stage 11 and connected first block coarse processing stage 12 to issue therefrom as K/x even index narrow band channels. In the illustrated two stage example x=2. The other part of the input signal is passed through the second block fine processing stage 11a and connected second block coarse processing stage 12a to issue therefrom as K/x odd index narrow band channels where in the illustrated example of FIG. 5 which is two stage, x=2. Thus in the demultiplexing mode with apparatus of the present application block fine filtering is formed on the wide band FDM input signal prior to the coarse filtering in the stages 12 and 12a.

In the multiplexing mode as shown in FIG. 6 the apparatus of the invention in the embodiment illustrated in FIG. 5 operates vice versa to that hereinbefore described in respect of the demultiplexing mode so that K/2 even index narrow band channels are fed at ports 15 to stage 12 and K/2 odd index narrow band channels are fed at ports 15 to stage 12a to issue as a FDM broadband output of K channels at port 14 (FIG. 3a). Thus in the multiplexing mode according to the apparatus of the present invention the block fine filtering process is applied to the output of the coarse filtering stage. This is completely opposite to the conventional process.

The first and second block fine processing stages 11 and 11a each comprising Finite Impulse Response (FIR) low or high pass filters. The first and second block coarse processing stages 12 and 12a each include a polyphase filter 16 and a Fast Fourier Transform (FFT) unit 17 with the polyphase filter 16 being connected at one side to the associated block coarse processing stage filter 11 or 11a and at the other side to one side of the FFT unit 17 whose other side provides the plurality of ports 15.

For convenience the theory underlying the operation of the apparatus of FIGS. 5 and 6 will now be described in terms of a complex critically sampled FDM of channels.

The input 14 to the demultiplexer (output from the multiplexer) is a critically sampled, complex FDM of K channels, each of width $$\frac{2\pi}{K}$$

radians/sample (FIG. 3a). The number of channels, K, is even and they are arranged in an even stacking configuration, i.e. the channels are centred at frequencies $$\omega_k = \frac{2\pi k}{K},$$

k=0, ..., K−1. Each channel slot is divided into passband region of width centred at $\omega_k$, where $0<\alpha<1$, and a guard band region of width $$\frac{(1-\alpha)\pi}{K}$$

on either side of the passband region. The demultiplexer (multiplexer) process must preserve a signal in the slot passband region from aliased (imaged) interference, and utilises the guard band regions for the transition bands for the transition bands of the channelisation filtering process.

The polyphase filter 16 which performs the coarse channelisation in conjunction with the FFT unit 17 is constructed from a real, lowpass prototype FIR filter $h_{coarse}$ with a unit sample response of length $N_{coarse}$. This filter has the following general specification:

Passband edge $\omega_p = \frac{\pi}{K}$

Stopband edge $\omega_s = \frac{3\pi}{K}$

Transition bandwidth $\Delta\omega = \frac{2\pi}{K}$

Length $N_{coarse} = D\frac{2\pi}{\Delta\omega} = DK$ where D is the proportionality constant of FIR filter design.

The tight or fine channelisation filter prototype $h_{fine}$ is also a FIR lowpass design with the following general specifications:

Passband edge $\omega_p = \frac{\alpha\pi}{2}$

Stopband edge $\omega_s = \frac{(2-\alpha)\pi}{2}$

Transition bandwidth $\Delta\omega = \pi(1-\alpha)$

This defines a half-band filter with length $$N_{fine} = D\frac{2\pi}{\Delta\omega} = \frac{2D}{1-\alpha}$$

Half-band filters have the useful property that the unit sample response of length N is of the form N=4J+1, where J is the number of distinct, non-zero taps. The number of distinct multiplications required per output sample is therefore (J+1).

Denoting the unit sample response of this half-band filter as $h_{fine}(n)$, n=0, ..., $N_{fine}-1$ A new filter 11 can be created with unit sample response $h_{f1}$ of the form:

$$h_{f1}(n) = h_{fine}(m), m = \frac{2n}{K}, n = 0, \ldots, \frac{KN_{fine}}{2} - 1 \quad (1)$$

Figure 4A:
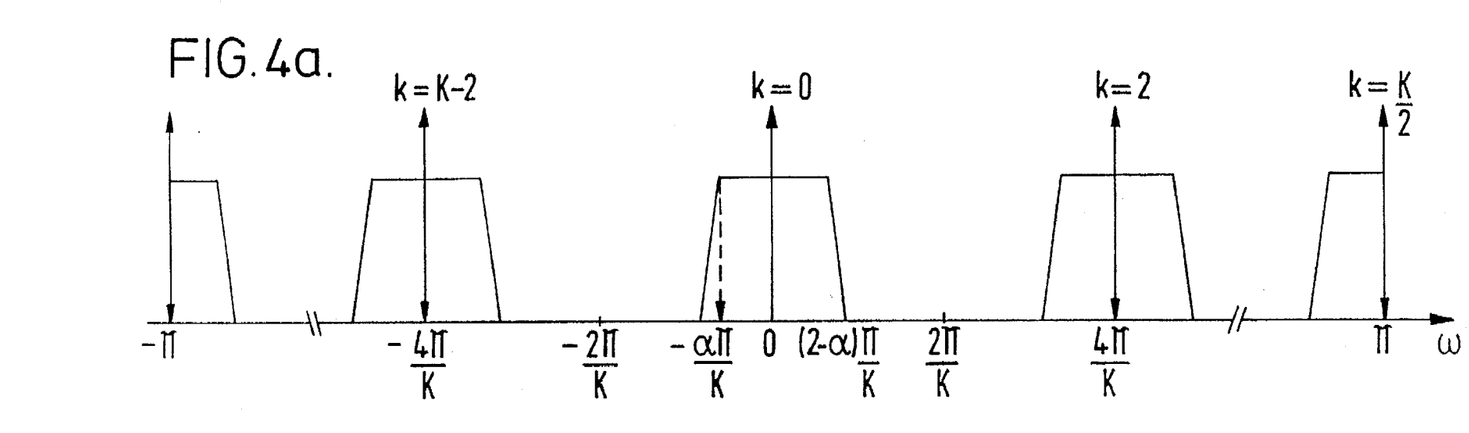
FIG. 4a is a graphical representation of the imaged frequency response of a prototype lowpass half-band filter for use in the apparatus of the present invention.

This is the (K/2)-fold interpolated version of $h_{fine}(n)$, formed by padding K/2−1 zeros between each original sample. The frequency response of this interpolated filter is an imaged version of the frequency response of the prototype filter $H_{fine}(e^{i\omega})$ as shown in FIG. 4a. Note that the imaged frequency response has its first passband cutoff at $\omega_p = \pm\alpha\pi/K$ and its first stopband edge at $\omega_s = \pm(2-\alpha)\pi/K$, and that the passbands in the filter response are centred at frequencies $2\pi 2k/K$, k=0, ..., K/2, which correspond to the centre frequencies of the even index channels in K-channel FDM.

Figure 4B:
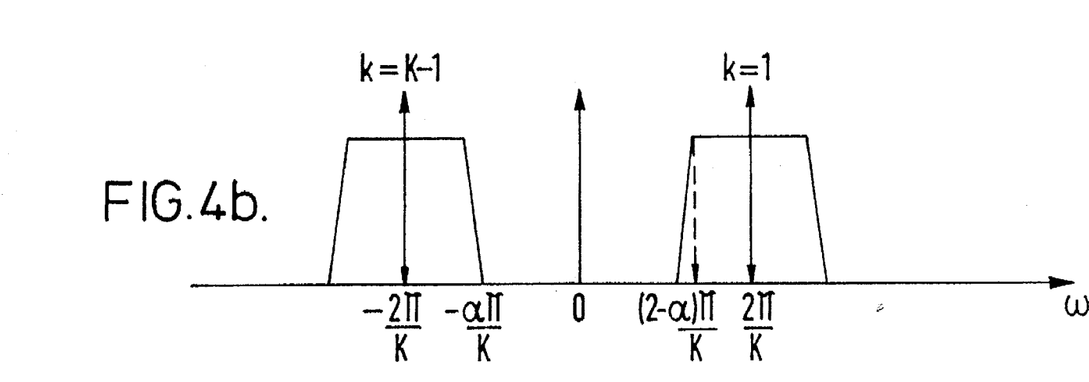
FIG. 4b is a graphical representation of the imaged frequency response of a prototype highpass half-band filter as used in the apparatus according to the present invention.

A complementary filter 11a which has an imaged frequency response with its passbands centred on the odd-index channels, as shown in FIG. 4b, can also be formed from the highpass version of the prototype. The required unit sample response of the filter, $h_{f2}$, is given by:

$$h_{f2}(n) = h_{fine}(m)(-1)^m, m = \frac{2n}{K}, n = 0, \ldots, \frac{KN_{fine}}{2} - 1 \quad (2)$$

The imaged ½-band filter pair $h_{f1}$ and $h_{f2}$ that is filters 11 and 11a, form the basis of the block fine filtering processor stage of the demultiplexer and multiplexer.

Thus in terms of the demultiplexer shown in FIG. 5 the input FDM signal 14 is copied into two parallel branches 18 and 19. The signal in branch 18 is filtered in the FIR filter 11 with the unit sample response $h_{f1}$ defined in equation (1), and the signal in branch 19 is filtered with the FIR filter 11a with the unit sample response $h_{f2}$ defined in equation (2). Note that the symmetry of the unit sample response of the prototype half-band filter $h_{fine}$ means that the outputs from both branch filters 11 and 11a can be computed from a common set of intermediate products of the non-zero samples of $h_{fine}$ and the input signal samples (the latter being the same in both branches).

This processing stage is therefore a block processor, in the sense that a single computational function is applied simultaneously to all the channels in the input FDM, which implements the fine filtering stage of the demultiplexing. This block fine processor has a single input and two outputs. The output on branch 18 retains the even-index channels and has the odd-index channels attenuated to the depth of the stopband of the prototype half-band filter $h_{fine}$. Similarly the output on branch 19 retains the odd-index channels and has the even-index channels attenuated. These outputs are then input to the separate coarse polyphase-FFT processors 12 and 12a which implement the filter $h_{coarse}$ and complete the demultiplexing of the even and odd index channels.

As shown in FIG. 5, the polyphase-FFT processors 12, 12a implement K-point FFTs, and so only half of their outputs are useful. An alternative would be to use K/2 point FFTs, which has the advantage of reduced computations in the FFT processor but the disadvantage of requiring a complex polyphase filter acting on branch 19, since its frequency response must be offset to match up with the odd-index channels.

In the conventional demultiplexer configuration, shown in FIG. 1, the maximum decimation factor in the coarse filtering polyphase-FFT processor is $M_{coarse}=K/2$, and indeed if a lower decimation factor $M_{coarse}<K/2$ is used then the individual filters $h_{fine}$ subsequently applied to the FFT outputs cannot be half-band designs, which increases their computational requirements. Thus the conventional approach to two-stage demultiplexing is effectively constrained to decimation factors of $M_{coarse}=K/2$ and $M_{fine}=2$ or 1, giving an overall decimation factor of either M=K or M=K/2 (FIG. 3c).

In contrast, the apparatus of the present invention utilises the computational efficiency of a half-band prototype filter in the block fine filtering stage without placing any constraint on the decimation factor in the polyphase-FFT coarse filtering stage, which can be chosen to suit the application. If an overall decimation factor of M=K is required, then the computational workload in the new architecture is identical to that of the conventional one; as the decimation M factor is reduced, the apparatus of the present invention becomes progressively more computationally efficient than the conventional equivalent. Referring to FIG. 3d, decimation by K is possible even though the transition bands (shown dashed) are now wholly aliased into each respective passband. However, these transition bands now correspond to the nulled out regions of FIGS. 4a and 4b and therefore contain no energy. Hence the aliasing of these bands into the passband does not cause a problem.

The apparatus of the present invention also has the advantage that the hardware requirements of the block fine front-end processors stage are fixed, regardless of the overall decimation factor in the demultiplexer, since this processor itself does not include any decimation. In contrast, conventional demultiplexers suffer from the disadvantage that the hardware implementation requirements for the bank of second stage filters increases as the overall decimation factor is reduced. Suppose, for example, that the polyphase-FFT features decimation by $M_{course}=K/m$, then the data rate of a time multiplexed output comprising the K channels will be m times the data rate of the input FDM, complicating the hardware implementation of the second stage filters.

The multiplexer mode of FIG. 6 is essentially that of the demultiplexer run in reverse order. The K baseband channels are separated into two parallel streams destined respectively for the even-index and odd-index slots in the output FDM. These streams are then applied as inputs to the pair of IFFT-polyphase processors 12, 12a as shown, which act to interpolate each channel up to the output FDM sampling rate and multiplex them onto the output FDM, with the coarse polyphase filters 16 now providing the required anti-image filtering associated with the interpolation process. The polyphase-IFFT outputs are filtered in the imaged half-band filters 11, 11a to remove residual energy left by the coarse interpolation filters 16 (e.g. due to imaging caused by up-sampling, or present in the inputs to the processor) in the even and odd index branches, respectively, and then summed to form the single output FDM signal at port 14. This last step is actually combined with the fine anti-image filtering.

Thus in the FIGS. 5 and 6 examples each FFT unit 17 is a K point unit and the apparatus operates with two block fine processing stages and two block coarse processing stages as a two stage multiplexer/demultiplexer with K/2 even index channels and K/2 odd index channels.

However the apparatus need not be limited to two stages and in the example of the apparatus of the present invention shown in FIG. 7 the apparatus is illustrated in demultiplexer mode as a three stage apparatus in which case K is divisible by four. The example of FIG. 7 is basically similar to that of FIGS. 5 and 6 and like parts will be given like numerals for convenience. However in the embodiment of the invention of FIG. 7, the first and second fine processing stages 11 and 11a each include a further imaged pair of FIR low pass filters 20 arranged in parallel in connection with the associated first and second block fine processing stage filters 11, two polyphase filters 16 and two FFT units 17. One polyphase filter 16 is connected at one side of the associated further imaged filter 20 and at the other side to one side of the associated FFT unit 17 whose other side provides the ports 15. The other polyphase filter 16a in each pair is in parallel with the filter 16 and connected at one side to the other associated further filter 20 of the imaged pair and at the other side to the side of the associated FFT unit 17 whose other side provides the ports 15. Thus in effect the branch 18 leading from the filter 11 is split into two parts 18a and 18b in which are in series filter 20, filter 16 and unit 17 and into branch 18b in which in series are located filter 20a, filter 16a and unit 17a. The same applies to the filter 11a whose output 19 is split into two parts 19a and 19b in which are located respectively filters 20, 16 and FFT unit 17 and filters 20a, 16a and FFT unit 17a.

In the example of FIG. 7 the first block fine processing stage utilising the filters 11 and 11a operates as described in connection with the FIG. 5 embodiment. However in the FIG. 7 embodiment the block fine processing stage 11 and 11a each comprises additionally the two further imaged filters 20 and 20a where the prototype half band filter has the following specifications:

Passband edge $\omega_p = \frac{\pi}{4}$

Stopband edge $\omega_s = \frac{3\pi}{4}$

Transition bandwidth $\Delta\omega = \frac{\pi}{2}$

The interpolation factor associated with this filter 20, 20a is now K/4. The number of distinct coefficients in its unit sample response will be small (typically 3 or 4, depending on the stopband specification) allowing hard-wired as opposed to general purpose fixed-point multipliers to be used in an ASIC realisation. The filter pair 20, 20a used in the block processor which acts on the outputs of branch 18 from the first stage are the lowpass prototype and its mirror image with frequency response shifted by $\pi$; the pair 20, 20a used in the block processor which acts on the output of branch 19 are the prototype response shifted by $+\pi/2$ and $-\pi/2$ respectively.

The third stage comprises 4 polyphase-FFT demultiplexers, based on K/4-points FFTs 17, 17a and with the coarse polyphase filters 16, 16a having the specification:

Passband edge $\omega_p = \frac{\pi}{K}$

Stopband edge $\omega_s = \frac{7\pi}{K}$

Transition bandwidth $\Delta\omega = \frac{6\pi}{K}$

Length $N_{coarse} = D\frac{2\pi}{\Delta\omega} = \frac{DK}{3}$

Thus in the FIG. 7 example there are two block fine processing stages and four block coarse processing stages 12 and 12a and the apparatus operates as a three stage multiplexer/demultiplexer with K/4 narrow band channels at each plurality of ports 15. It is of course possible to extend the invention to more than three stages in a manner analogous to that of FIG. 7.

We claim:

1. A digital signal processing apparatus for frequency demultiplexing of narrow band Frequency Division Multiplex (FDM) signals, including a block fine processing stage and a plurality (x) of block coarse processing stages, the block fine processing stage having an input for a FDM signal of a plurality of (K) narrow band channels, outputs for at least one FDM signal with K/x even index channels, the region of the spectrum corresponding to K/x odd index channels having been nulled out, and at least one FDM signal with K/x odd index channels, the region of the spectrum corresponding to the K/x even index channels having been nulled out, the input of each of the block coarse processing stages being coupled to a respective output of the block fine processing stage and each, block coarse processing stage having outputs for the K/x narrow band channels, each block coarse processing stage performing a filtering function with an imaged response the transition bands of which lie in the nulled out regions of the spectrum of the associated output of the fine processing stage.

2. Apparatus according to claim 1, wherein the block fine processing stage comprises at least one Finite Impulse Response (FIR) low pass filter.

3. Apparatus according to claim 2, wherein the block fine processing stage includes an interpolated lowpass half-band filter, and an interpolated highpass half-band filter complementary thereto and forming an imaged pair therewith.

4. Apparatus according to claim 1, wherein the x coarse processing stages each include a polyphase filter and a Fast Fourier Transform (FFT) unit with the polyphase filter being connected at one side to the respective output of the block fine processing stage filter and at the other side to one side of the FFT unit whose other side provides the outputs for the K/x narrow band channels.

5. Apparatus according to claim 4, wherein each polyphase filter is a real low pass Finite Impulse Response (FIR) filter and each FFT unit is a K point unit.

6. Apparatus according to claim 1, having two block fine processing stages and two block coarse processing stages operable as a two stage multiplexer/demultiplexer with K/2 even index channels at the first block coarse processing stage plurality of ports and K/2 odd index channels at the second block coarse processing stage plurality of ports.

7. Apparatus according to claim 1, wherein the block fine processing stage includes a further imaged pair of FIR low pass filters arranged in parallel in connection with two polyphase filters and two FFT units, with one polyphase filter being connected at one side to the associated FIR low pass filter of the further imaged pair and at the other side to one side of the FFT unit whose other side provides said plurality of ports, and with the other polyphase filter being in parallel with one said polyphase filter and being connected at one side to the other associated FIR low pass filter of the further imaged pair and at the other side to one side of the associated FFT unit whose other side provides said plurality of ports.

8. Apparatus according to claim 7, having two block fine processing stages and four block coarse processing stages operable as a three stage multiplexer/demultiplexer with K/4 narrow band channels at each block coarse processing stage plurality of ports.

9. A digital signal processing apparatus for frequency multiplexing of narrow band Frequency Division Multiplex (FDM) signals, including a plurality (x) of block coarse processing stages and a plurality of (K) narrow band channels, each block course processing stage having respective inputs for K/x narrow band channels, and an output for a FDM signal with K/x channels, a block fine processing stage having inputs coupled to respective outputs of block coarse processing stages, and arranged to combine at least one input FDM signal with K/x even index channels with at least one input FDM signal with K/x odd index channels, the region of the spectrum corresponding to the odd index channels and the even index channels respectively being nulled in each case, to produce a FDM signal of K narrow band channels, each block coarse processing stage performing a filtering function with an imaged response the transition bands of which lie in the nulled out regions of the response corresponding to the respective inputs of the block fine processing stage.

10. Apparatus according to claim 9, wherein the block fine processing stage comprises at least one Finite Impulse Response (FIR) low pass filter.

11. Apparatus according to claim 10, wherein the block fine processing stage includes an interpolated lowpass half-band filter, and an interpolated highpass half-band filter complementary thereto and forming an imaged pair therewith.

12. Apparatus according to claim 9, wherein the x block coarse processing stages each include a polyphase filter and a Fast Fourier Transform (FFT) unit with the polyphase filter being connected at one side to the respective input of the block fine processing stage filter and at the other side to one side of the FFT unit whose other side provides the inputs for the K/x narrow band channels.

13. Apparatus according to claim 12, wherein each polyphase filter is a real low pass Finite Impulse Response (FIR) filter and each FFT unit is a K point unit.

14. Apparatus according to claim 9, having two block fine processing stages and two block coarse processing stages operable as a two stage multiplexer/demultiplexer with K/2 even index channels at the first block coarse processing stage plurality of ports and K/2 odd index channels at the second block coarse processing stage plurality of ports.

15. Apparatus according to claim 9, wherein the block fine processing stage includes a further imaged pair of FIR low pass filters arranged in parallel in connection with two polyphase filters and two FFT units, with one polyphase filter being connected at one side to the associated FIR low pass filter of the further imaged pair and at the other side to one side of the FFT unit whose other side provides said plurality of ports, and with the other polyphase filter being in parallel with one said polyphase filter and being connected at one side to the other associated FIR low pass filter of the further imaged pair and at the other side to one side of the associated FFT unit whose other side provides said plurality of ports.

16. Apparatus according to claim 15, having two block fine processing stages and four block coarse processing stages operable as a three stage multiplexer/demultiplexer with K/4 narrow band channels at each block coarse processing stage plurality of ports.

* * * * *

UNITED STATES PATENT AND TRADEMARK OFFICE
CERTIFICATE OF CORRECTION

PATENT NO.  : 5,699,363
DATED       : December 16, 1997
INVENTOR(S) : Alexander W. Wishart, et. al.

It is certified that error appears in the above-indentified patent and that said Letters Patent is hereby corrected as shown below:

Title page, item [73], Assignee:  should read

--Matra Marconi Space Systems UK Limited, The Goove, Warren Lane, Stanmore, Middlesex, Great Britain HA7 4LY--

Signed and Sealed this

Twentieth Day of March, 2001

Attest:

NICHOLAS P. GODICI

*Attesting Officer*    *Acting Director of the United States Patent and Trademark Office*